United States Patent [19]

Saito

[11] Patent Number: 4,695,180
[45] Date of Patent: Sep. 22, 1987

[54] LINK COUPLING DEVICE
[75] Inventor: Yasuziro Saito, Fujisawa, Japan
[73] Assignee: Jidosha Denki Kogyo Kabushiki Kaisha, Japan
[21] Appl. No.: 877,933
[22] Filed: Jun. 24, 1986
[30] Foreign Application Priority Data Jun. 28, 1985 [JP]  Japan ............................ 60-99194[U]

[51] Int. Cl.⁴ ............................................. F16C 11/06
[52] U.S. Cl. ..................................... 403/114; 403/116; 15/250.17
[58] Field of Search ............... 403/114, 115, 133, 142, 403/90, 116; 74/600; 15/250.17; 248/288.3, 288.5

[56] References Cited

U.S. PATENT DOCUMENTS 3,408,124  10/1968  Melton et al. ....................... 403/133
3,806,624   4/1974  Klement et al. ............. 15/250.17 X
3,808,629   5/1974  Druseikis ........................... 15/250.17
4,577,987   3/1986  Buhl et al. ........................... 403/133

FOREIGN PATENT DOCUMENTS 1486836  5/1967  France ................................. 403/115
 461466  1/1951  Italy .................................... 403/114
 890255  2/1962  United Kingdom ................ 403/115

Primary Examiner—Cornelius J. Husar
Assistant Examiner—Joseph A. Fischetti
Attorney, Agent, or Firm—Sughrue, Mion, Zinn, Macpeak and Seas

[57] ABSTRACT

A link coupling device comprising a ball pin and a ball retainer is disclosed, wherein the ball pin is provided with a movement-restricting projection portion and the ball retainer is provided with a movement-restricting recess portion capable of engaging with the movement-restricting projection portion when the spherical part of the ball pin is press-fitted into the press fitting part of the ball retainer.

3 Claims, 3 Drawing Figures

LINK COUPLING DEVICE

BACKGROUND OF THE INVENTION

1. Field of the Invention

This invention relates to a link coupling device for use in a link mechanism oscillating two or more wiper blades through a single wiper motor in an electric windshield wiper assembly which wipes off raindrops and the like from, for example, a front windowglass of an automobile.

2. Related Art Statement

As the conventional link coupling device, there is for example, a device as shown in FIG. 3 and described in Japanese Utility Model laid open No. 58-122646.

This conventional device comprises a ball pin 110 fixed to a motor link arm 120, and a ball retainer 101 attached to a link connecting rod 118 and receiving the ball pin 110 therein. The ball pin 110 is made of a metal and comprises a spherical portion 111 and a cylindrical fixing portion 112 fixed at its end to the motor link arm 120. In the upper part of the spherical portion 111 is formed a circular 113.

On the other hand, the ball retainer 101 is made of a synthetic resin and has an approximately spherical shell shape having an opening 105 and provided inside the opening with a force-fitting portion 102 capable of press-fitting the spherical portion 111 of the ball pin 110 into the inside thereof. Furthermore, the ball retainer 101 is provided at the outer periphery with a collar portion 104 in parallel with the opening 105. A receiving groove 104a is formed in the collar portion 104, which receives the link connecting rod 118 through a receiving hole 118a formed therein to thereby attach the ball retainer 101 to the link connecting rod 118. Moreover, a protrusion 103 capable of freely inserting into the dent 113 of the ball pin 110 is arranged in the force-fitting portion 102 of the ball retainer 101 at the inner part thereof. When the ball retainer 101 is force-fitted to the spherical portion 111 of the ball pin 110, the protrusion 103 of the ball retainer 101 becomes inserted into the dent 113 of the ball pin 110, and consequently the unnecessary distortion of the ball retainer 101 is controlled by contacting the peripheral wall 103a of the protrusion 103 of the ball retainer 101 with the side wall 113a of the dent 113.

However, when the unnecessary distortion movement of the ball retainer 101 force-fitted into the ball pin 110 is controlled by contacting the peripheral wall 103a of the protrusion 103 in the ball retainer 101 with the side wall 113a of the dent 113 in the spherical portion 111 of the ball pin 110, since a protruding portion subjected to a larger force is formed as the protrusion 103 of the ball retainer 101 made of the synthetic resin, cracks may be produced in the base of the protrusion 103 to cause fracture, and consequently the loss of the link function is brought about by the contact between the link connecting rod 118 and the motor link arm 120 due to the excessive movement of the ball retainer 101 and the like.

SUMMARY OF THE INVENTION

It is an object of the invention to solve the aforementioned problems and to provide a link coupling device which surely regulates the unnecessary distortion movement of the ball retainer forced onto the ball pin and reduces the loss of the link function due to the breaking of the regulated portion.

According to the invention, there is the provision of a link coupling device comprising a ball pin fixed to a motor link arm and made of a metal, and a ball retainer attached to a link connecting rod and made of a synthetic resin; said ball pin being provided at its spherical part with a movement-restricting projection portion, and said ball retainer being provided with a spherical recess capable of receiving said spherical part and a movement-restricting recess portion in said spherical recess portion capable of engaging with said movement-restricting projection portion so as to connect said motor link with said link connecting rod through the spheric pair between said spherical recess part and spherical part.

BRIEF DESCRIPTION OF THE DRAWINGS

The invention will be described with reference to the accompanying drawings, wherein.

DESCRIPTION OF THE PREFERRED EMBODIMENTS

An embodiment of the link coupling device according to the invention will be described in detail with reference to FIGS. 1 and 2.

Figure 1:
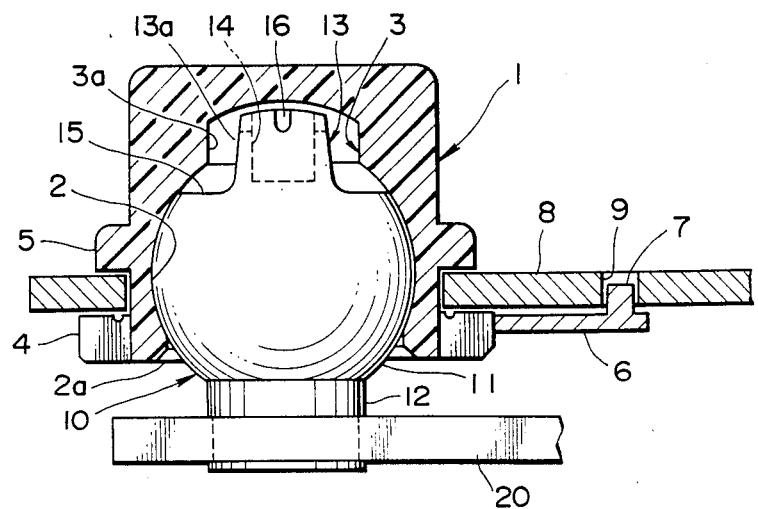
FIG. 1 is a sectional view of an embodiment of the link coupling device according to the invention.
Figure 2:
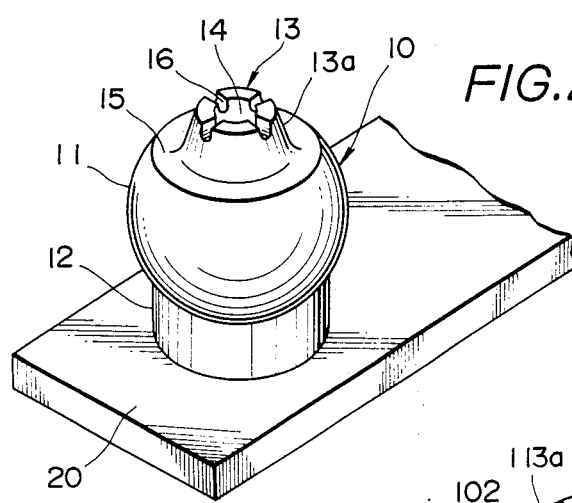
FIG. 2 is a perspective view illustrating a state of fixing the ball pin to the motor link arm.
Figure 3:
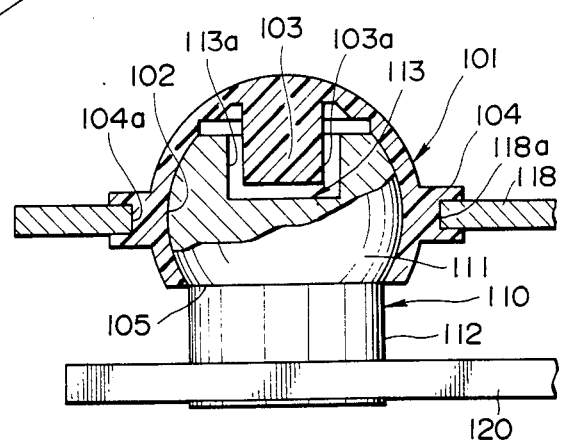
FIG. 3 is a sectional view of the conventional link coupling device.

In FIG. 1 is shown such a state that a ball pin 10 fixed to a motor link arm 20 is force-fitted into a ball retainer 1 attached to a link connecting rod 8. Referring to FIG. 2, the ball pin 10 is made of a metal such as steel or the like and comprises a spherical part 11 and a cylindrical fixing part 12. The ball pin 10 is fixed at the end face of the fixing part 12 to the motor link arm 20 by peening, or deforming, the end face after it is inserted through the opening in the link arm. On the other hand, a movement-restricting projection portion 13 having a tapered cylindrical outer peripheral wall 13a and provided therein with a cylindrical recess portion 14 is arranged in the top of the spherical part 11, and an annular flat part 15 is formed on the outer edge at the base of the movement-restricting projection portion 13.

Moreover, a cross-shaped oil groove 16 if formed in the upper end part of the movement-restricting projection portion 13 and is utilized to agitate the lubricant located in the recess portion.

As shown in FIG. 1, the ball retainer 1 is made of a relatively soft material such as a synthetic resin with an approximately brimmed hat shape and is provided at the inside with a spherical recess 2 having an opening portion 2a capable of receiving the spherical part 11 of the ball pin 10 and at the lower outside with a brim-like portion 4. In the spherical recess 2, a movement-restricting recess portion 3 having an inner wall 3a capable of freely engaging with the movement-restricting projection portion 13 in the spherical part 11 of the ball pin 10 is formed at the bottom opposite to the opening portion 2a. The link connecting rod 8 is held between the brim-like portion 4 and a protrusion 5 arranged on the outer periphery of the ball retainer 1 and attached to the ball retainer 1 at a state of restricting the upward and downward movement. The link connecting rod is attached to the ball retainer after the ball pin has been inserted into the spherical recess 2 of the ball retainer. Moreover, the movement in rotational direction of the link connecting rod 8 to the ball retainer 1 is restricted by engaging a hooking protrusion 7 of a hook plate 6 provided in the ball retainer 1 with a hook receiving hole 9 formed in the link connecting rod 8.

When the spherical part 11 of the ball pin 10 is forced into the spherical recess 2 of the opening portion 2a of the ball retainer 1, the movement-restricting projection portion 13 of the spherical part 11 is engaged with the movement-restricting recess portion 3 of the spherical recess 2 at a sufficient leeway to contact the outer peripheral wall 13a of the movement-restricting projection portion 13 with the inner peripheral wall 3a of the movement-restricting recess portion 3. Thus, the unnecessary distortion movement is regulated between the ball retainer 1 attached to the link connection rod 8 and the ball pin 10 fixed to the motor link 20. Moreover, since the outer peripheral wall 13a of the movement-restricting projection portion 13 is rendered into a tapered cylindrical shape, when the outer peripheral wall 13a of the move-restricting projection portion 13 comes into contact with the inner peripheral wall 3a of the movement-restricting recess portion 3, the contacting part is rendered into a face contact, so that the breakage of the movement-restricting recess portion 3 in the ball retainer 1 is effectively prevented.

As mentioned above, according to the invention, the movement-restricting projection portion is formed in the spherical part of the ball pin fixed to the motor link arm and made of the metal, while the movement-restricting recess portion capable of engaging with the movement-restricting projection portion in the ball pin is formed in the spherical recess part of the ball retainer capable of force-fitting the spherical part and attached to the link connecting rod and made of the synthetic resin, and further the motor link arm is connected to the link connecting rod through the link coupling formed by forcing the spherical part of the ball pin into the spherical recess part of the ball retainer. Therefore, the unnecessary distortion movement of the ball retainer attached to the link connecting rod is surely regulated against the ball pin fixed to the motor link arm, and also the loss of the link function due to the contact between the motor link arm and the link connecting rod can be prevented effectively.

What is claimed is:

1. A link coupling device comprising:
  a ball pin of a metallic material, said ball pin having a cylindrical fixing part, and a spherical part contiguous with said fixing part, a movement restricting projection portion contiguous with said spherical part and opposite said fixing part, said projection portion having an outer peripheral wall of a tapered cylindrical shape and a cylindrical recess therein with an oil groove being provided at an upper end of said projection portion;
  a motor link arm fixed to said ball pin;
  a one-piece ball retainer of a synthetic resin having a spherical recess therein and a movement restricting cylindrical recess in the bottom of the spherical recess, said ball retainer being forced over the ball pin with said cylindrical recess of the ball retainer receiving said projection portion of the ball pin and said spherical recess of the ball retainer receiving said spherical part of the ball pin; and
  a link connecting rod attached to said ball retainer, whereby said motor link arm and said link connecting rod are connected through said ball pin and ball retainer for limited movement relative to each other.

2. The link coupling device according to claim 1 wherein said oil groove at the upper end part of the movement restricting projection portion is cross-shaped.

3. The link coupling device according to claim 1, wherein said link connection rod is held between a brim portion and a protrusion formed on an outer periphery of said ball retainer.

* * * * *